United States Patent [19]
Hennig

[11] Patent Number: 5,203,069
[45] Date of Patent: Apr. 20, 1993

[54] METHOD OF PRODUCING A TELESCOPIC COVER WITH ROUNDED CORNERS

[75] Inventor: Kurt Hennig, Munich, Fed. Rep. of Germany

[73] Assignee: Gebr. Hennig GmbH, Ismaning, Fed. Rep. of Germany

[21] Appl. No.: 598,851

[22] Filed: Oct. 15, 1990

[30] Foreign Application Priority Data

Oct. 31, 1989 [DE] Fed. Rep. of Germany ....... 3936213

[51] Int. Cl.$^5$ ............................................. B23P 13/04
[52] U.S. Cl. .................... 29/557; 29/DIG. 3; 29/434; 72/335; 72/379.2
[58] Field of Search .......... 29/17.1, 17.2, 434, 29/436, 455.1, 557, DIG. 3; 72/335, 379.2

[56] References Cited

U.S. PATENT DOCUMENTS

| | | | |
|---|---|---|---|
| 2,006,925 | 7/1935 | Klemp | 72/335 |
| 2,207,381 | 7/1940 | Lang | 72/379.2 |
| 2,312,721 | 3/1943 | Lang | 29/525.1 |
| 3,296,991 | 1/1967 | Rawson | 72/335 |
| 3,603,651 | 9/1971 | Weber | 384/16 |
| 3,857,270 | 12/1974 | Iten | 72/379.2 |
| 4,886,375 | 12/1989 | Tsukada | 384/15 |

Primary Examiner—P. W. Echols
Assistant Examiner—David P. Bryant
Attorney, Agent, or Firm—Hopkins & Thomas

[57] ABSTRACT

The invention relates to a method of producing a telescopic cover by bending a flat sheet material blank, in which a diamond-shaped cut-out is provided in the sheet material blank and is separated from the adjacent outer edge by a continuous material zone which is stretched without cracking during the bending operation to form a corner zone with a rounded contour.

3 Claims, 4 Drawing Sheets

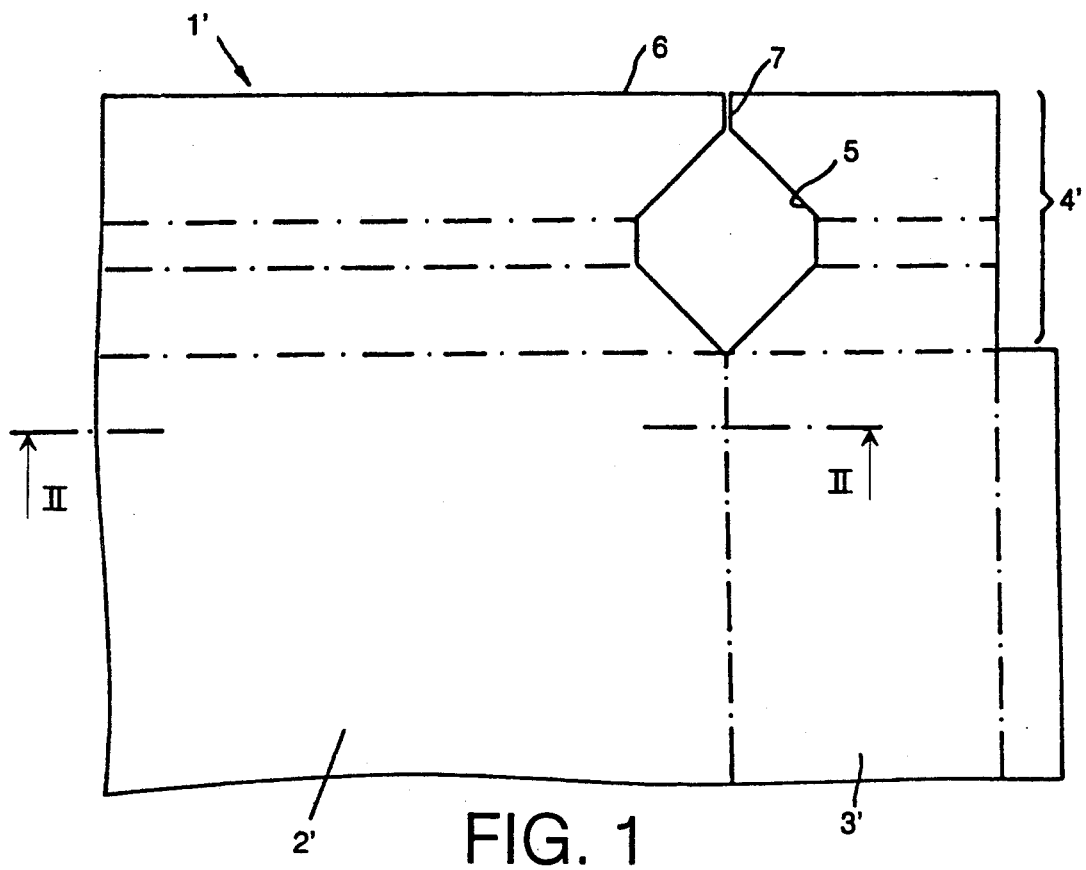
FIG. 1
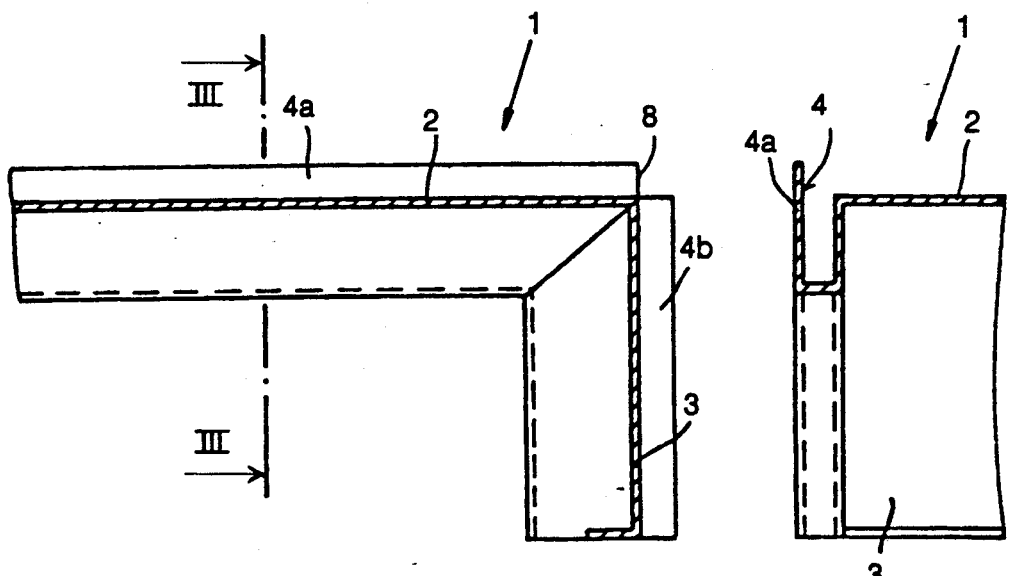
FIG. 2
FIG. 3

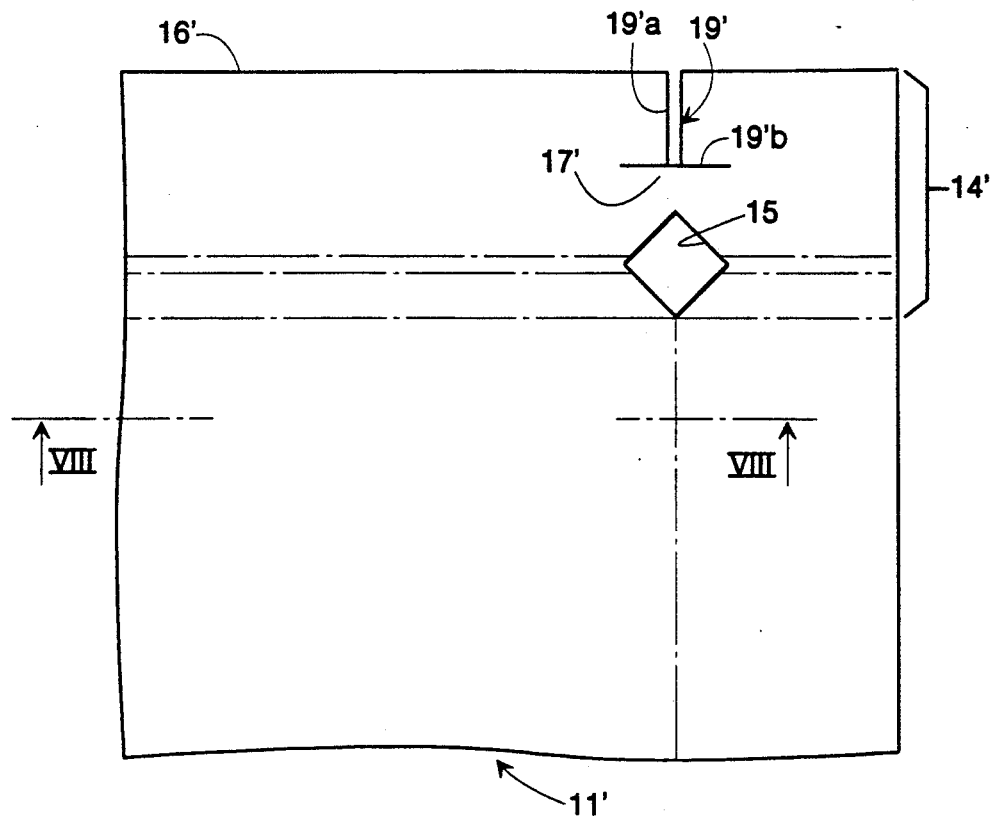
FIG. 7
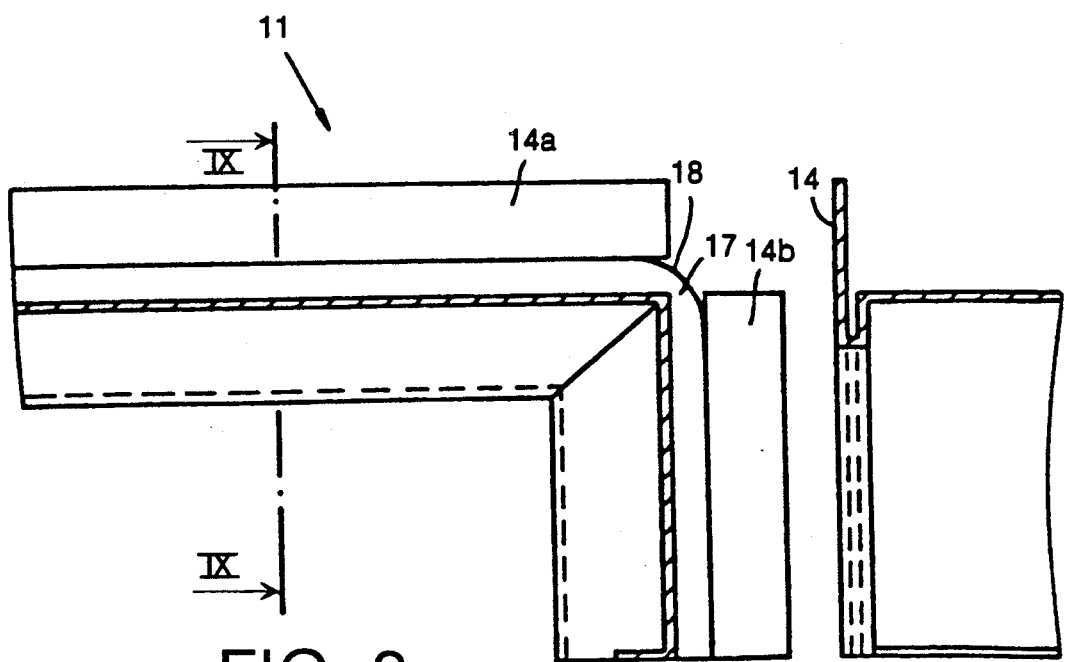
FIG. 8
FIG. 9

METHOD OF PRODUCING A TELESCOPIC COVER WITH ROUNDED CORNERS

FIELD OF THE INVENTION

The invention relates to a method for producing a telescopic cover and to a telescopic cover.

BACKGROUND OF THE INVENTION

A method of producing a telescopic cover and a telescopic cover are the subject matter of the earlier application PCT/EP 89/00244 by the applicant. This prior art is explained in detail with the aid of FIGS. 1 to 3 in the description. In this method, during production of the diamond-shaped cut-out in the flat sheet material blank the material zone between the diamond-shaped cut-out and the adjacent outer end (which in the finished telescopic cover runs at right angles to the longitudinal direction of the cover) of the sheet material blank is separated by a stamped cut, so that the sections of the end region located on different sides of this stamped cut can move together with the top wall and the adjoining side wall freely relative to one another during bending of the sheet material blank. Thus this method results in a cover in which the end region which projects outwards over the top wall and the side walls has a right-angled cut-out in the two corner zones which must then be closed again in a separate operation (for instance by welding) in order to produce the necessary sealing of the cover element in the corner zones of the end region.

SUMMARY OF THE INVENTION

The object of the invention is to provide a method for producing a telescopic cover as well as a telescopic cover in such a way that a separate working stage following the bending operation in order to produce sealing of the two corner zones of the end region is unnecessary.

According to the invention the diamond-shaped cut-out is produced as a closed opening which is separated from the adjacent outer edge (which in the finished telescopic cover runs at right angles to the longitudinal direction of the cover) of the sheet material blank by a continuous material zone. Thus according to the invention the stamped cut which was previously provided in the region of this material zone is omitted.

The width of this continuous material zone (measured in the longitudinal direction of the telescopic cover) is chosen, taking into account the thickness of the sheet material blank, so that this material zone is stretched without cracking during bending of the sheet material blank to form a corner zone with a rounded outer contour.

Contrary to all expectations, in the tests on which the invention is based it proved possible to stretch the said material zone without cracking during bending of the sheet material blank. In this way the corner zone is given a rounded outer contour which does not require any further machining, and this corner zone formed by the stretched material ensures the necessary sealing of the end region of the cover element.

The rounded outer contour of the two corner zones of the cover element also proves advantageous for the sliding movement of the cover element within the telescopic cover, since the top wall and the two side walls of the next larger cover element have a certain bending radius on their bending zones.

BRIEF DESCRIPTION OF THE DRAWINGS

The invention will be explained in detail below with the aid of several embodiments which are illustrated in the drawings, in which:

FIG. 1 shows a top view of the known sheet material blank,

FIG. 2 shows a section (along the line II—II of FIG. 1) through the cover element after folding the known sheet material blank according to FIG. 1, FIG. 3 shows a section (along the line III—III of FIG. 2), FIGS. 7 to 9 show a top view and sections of a second embodiment of the invention.

DETAILED DESCRIPTION OF THE INVENTION

Figure 4:
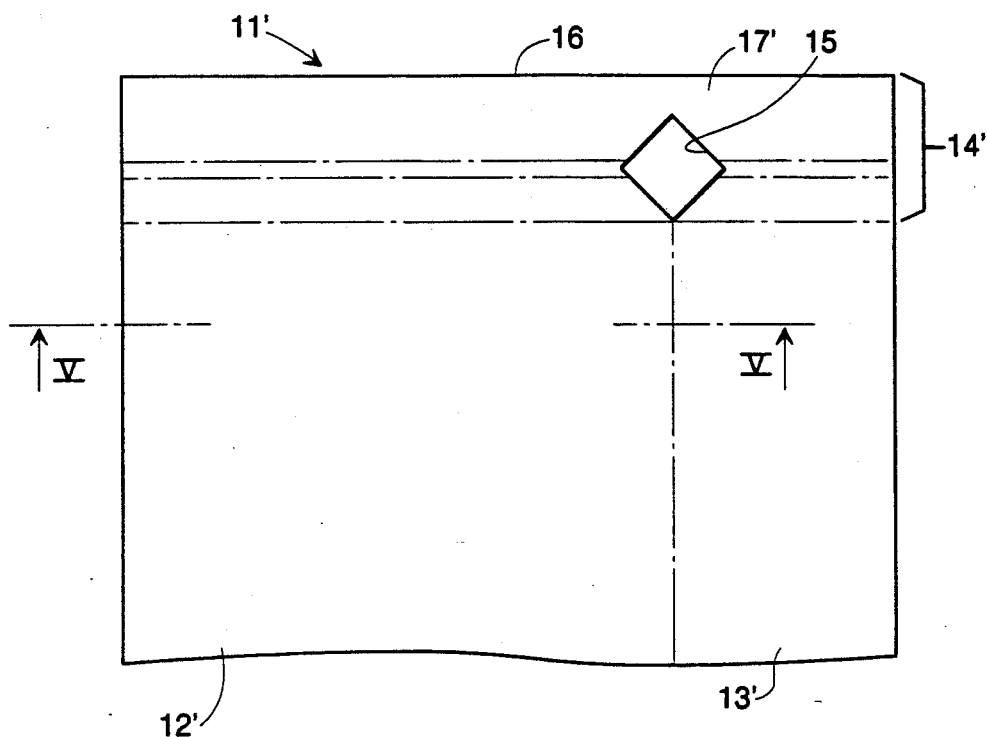
FIGS. 4 to 6 show a top view and sections of a first embodiment of the invention.

The known cover element 1 which is shown in partial section in FIGS. 2 and 3 comprises a top wall 2 and two side walls 3 (of which only the right-hand side wall 3 is visible in FIG. 2).

The cover element 1 is also provided with an end region 4 which runs at right angles to the longitudinal direction of the telescopic cover (i.e. perpendicular to the drawing plane of FIG. 3) and which projects outwards with its sections 4a and 4b which are visible in FIG. 2 over the top wall 2 and the two side walls 3.

The end region 4 is bent in a U shape in cross-section (cf. FIG. 3), and the free arm of the U which forms the sections 4a and 4b points outwards.

FIG. 1 shows the flat sheet material blank 1' which is used to produce the cover element according to FIGS. 2 and 3. In this case after bending the zone 2' forms the top wall 2, the zone 3' the side wall 3 and the zone 4' the end region 4.

In the zone 4' of the sheet material blank 1' an approximately diamond-shaped cut-out 5 is provided which facilitates bending of the sheet material blank 1' to form the cover element 1 shown in FIGS. 2 and 3.

The lines along which the sheet material blank 1' is bent are shown in FIG. 1 by dash-dot lines.

In the known sheet material blank 1' which is shown in FIG. 1 a stamped cut 7 is provided between the cut-out 5 and the adjacent outer edge 6 of the sheet material blank. This certainly facilitates free bending of the sheet material blank 1', but in leads the finished product to an inconvenient cut-out 8 in the two corner zones. This cut-out 8 must be closed in a suitable manner (for instance by welding) at a later stage in a separate operation in order to ensure the necessary sealing between the adjacent cover elements of the telescopic cover.

Figures 5, 6:
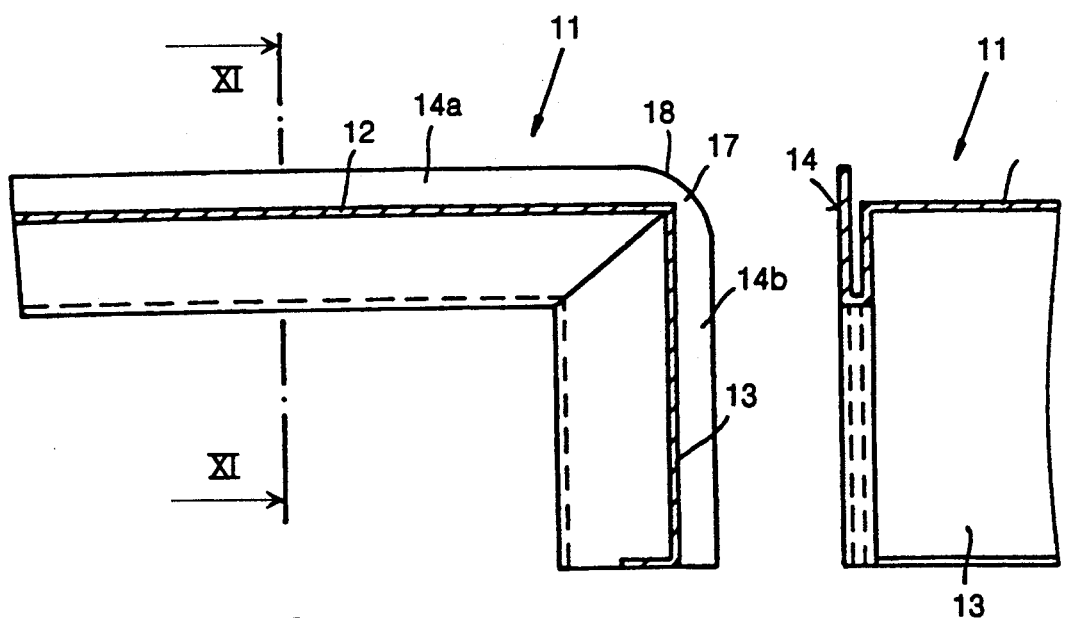

FIGS. 4 to 6 show a first embodiment of the invention in which the disadvantage of the known construction which is mentioned above is avoided.

The cover element 11 consists in the same manner of a top wall 12, side walls 13 and an end region 14. This end region 14 has sections 14a, 14b which adjoin the top wall 12 and the side walls 13 respectively.

The sheet material blank 11' shown in FIG. 4 contains a zone 12' (which later forms the top wall 12), zones 13' (which later form the side walls 13) as well as a zone 14'

(which later forms the end region 14). A diamond-shaped cut-out 15 is provided in the zone 14'.

In contrast to the known sheet material blank 1' (according to FIG. 1), in the sheet material blank 11' according to the invention (according to FIG. 4) the cut-out 15 is produced as a closed opening which is separated from the adjacent outer edge 16 of the sheet material blank 11' by a continuous material zone 17'.

The width of this material zone (measured in the longitudinal direction of the telescopic cover) is chosen taking account of the thickness of the sheet material blank 11' so that this material zone 17' is stretched without cracking during bending of the sheet material blank 11' so that a corner zone 17 with a rounded outer contour 18 is produced.

In the embodiment illustrated in FIGS. 4 to 6 the end region 14 has the cross-sectional shape of a simple U (cf. FIG. 6). the free arm of which (which forms the sections 14a and 14b) points towards the outside of the cover element 11.

In the further embodiment of the invention which is illustrated in FIGS. 7 to 9 the same elements are designated by the same reference numerals as in FIGS. 4 to 6.

In this embodiment the zone 14' of the sheet material blank 11', which in the finished cover element forms the end region 14, has a greater width than in the construction according to FIGS. 4 to 6. In addition to the cut-out 15, a T-shaped cut 19' is provided in the zone 14' of the sheet material blank 11', adjoining the continuous material zone 17' which is intended for stretching, so that the arm 19'a of the said material zone 17' runs at right angles to the adjacent outer edge 16 of the zone 14b as far as this outer edge 16, whilst the crosspiece 19'b of the T-shaped cut 19' runs parallel to the adjacent outer edge 16.

If the sheet material blank 11' shown in FIG. 7 is bent along the dash-dot lines, this produces the shape which can be seen from FIGS. 8 and 9. In this case the material zone 17' of the sheet material blank 11' is again stretched into a corner zone 17 with a curved outer contour 18.

As becomes clear from a comparison of FIGS. 7 and 8, in the bending operation the continuous material zone 17' which is intended for stretching is defined to the outside by the crosspiece 19'b of the T-shaped cut 19'.

In the cover element 11 which is shown in FIGS. 8 and 9 and produced from the sheet material blank 11' according to FIG. 7, the sections 14a and 14b of the end region 14 which adjoin the corner zone 17 have a greater height than the corner zone 17. Such a construction is advantageous for example in order to connect the cover element in question as the last cover element of the telescopic cover to a machine part.

Figure 10:
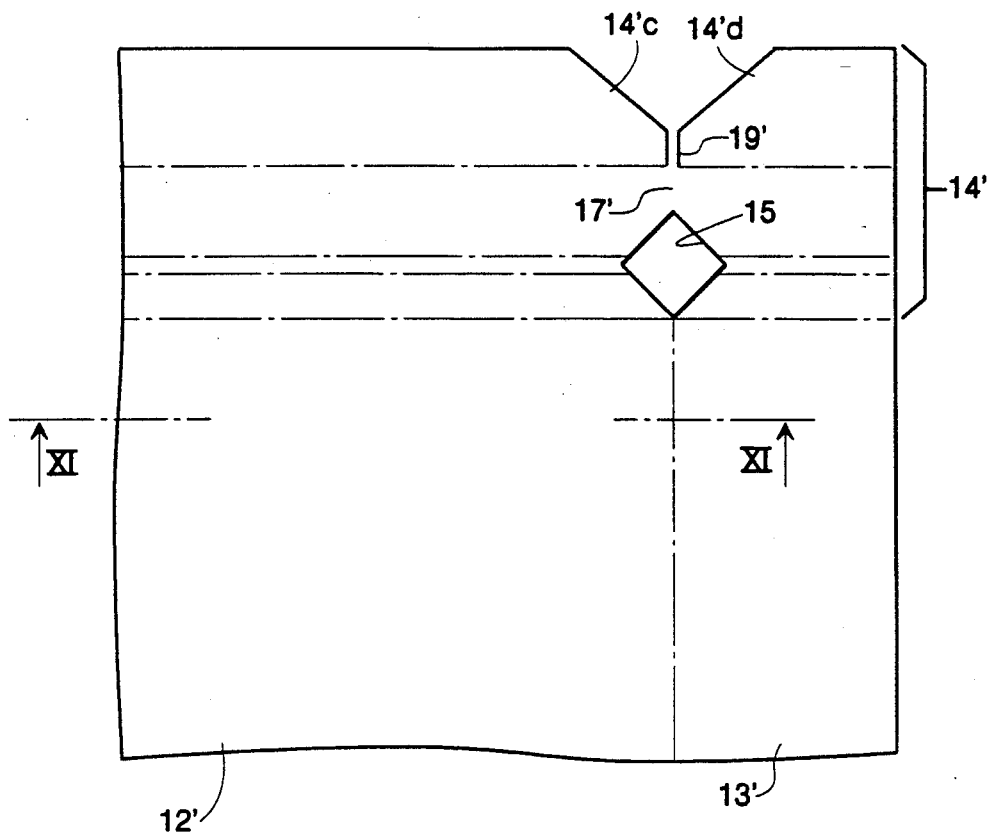
FIGS. 10 to 12 show a top view and section of a third embodiment of the invention.
Figures 11, 12:
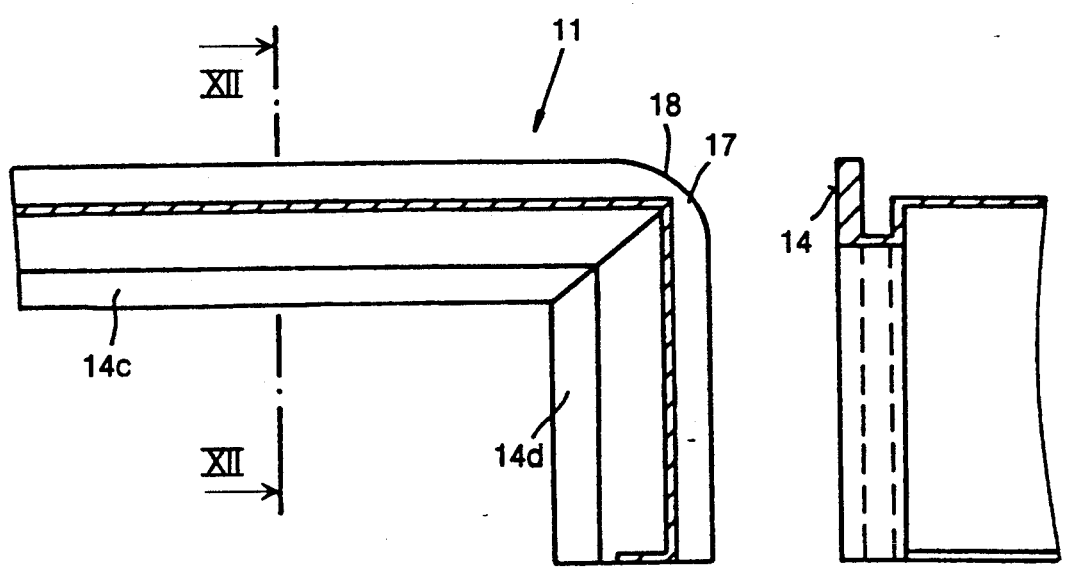

FIGS. 10 to 12 show a further embodiment of the invention in which the same elements are again designated by the same reference numerals as in FIGS. 4 to 9.

Whereas in the embodiment according to FIGS. 4 to 9 the end region 14 has the cross-sectional shape of a simple U in which the free arm points towards the outside of the cover element, in the embodiment according to FIGS. 10 to 12 the end region 14 is constructed in cross-section as two continuous U shapes directed in opposite directions (cf. FIG. 12), in which the free arm which forms the sections 14c, 14d points towards the inside of the cover element 11.

In view of this double bending of the end region 14 the zone 14' of the sheet material blank 11' is constructed with an increased width. The zone 14' also contains the cut-out 15 which has already been explained and the T-shaped cut 19' which is separated from the cut-out 15 by the material zone 17' which during bending of the sheet metal blank 11' forms the corner zone 17 with rounded outer contour 18. Adjoining the cut 19' the two part-zones 14'c and 14'd are inclined like a miter cut by 45°.

The telescopic cover can be made from the most varied materials, particularly from metals, plastics or from compound materials (e.g. metals with a plastic overlay). Wherever "sheet material" is mentioned above, it should be understood to cover not only metal sheets but also plastic sheet material.

While preferred embodiments of the invention have been shown and described in detail in the drawing and preceding specification, it will be understood by those skilled in the art that variations and modifications of the disclosed embodiments may be made without departing from the spirit and scope of the invention as defined by the following claims.

I claim:

1. A method of producing a cover element for a telescopic cover for covering machine tools, the telescopic cover comprising a plurality of said cover elements movable in a longitudinal direction into and out of one another, said cover element including a top wall connecting opposed side walls and an end region extending at a right angle to the longitudinal direction, the end region being formed at least once in a U-shaped cross-section and projecting outwardly from the top wall and the side walls, the method comprising the steps of:

providing a flat sheet material blank for ultimately producing said top wall, side walls, and said end region of said cover element;

forming diamond-shaped cut-outs in said flat sheet material blank at corner zones which are disposed to ultimately form corners between said top wall and said side walls in said end region, said diamond-shaped cut-outs formed as respective closed perimeter openings and separated from an outer edge of said sheet material blank by corresponding continuous material zones;

forming a T-shaped cut in said flat sheet material blank bordering on said continuous material zones so that the arm of said T-shaped cut extends at a right angle to said outer edge where said end region is formed and the crosspiece of said T-shaped cut extends parallel to said edge;

bending said flat sheet material blank near said outer edge into said U-shaped cross-section to thereby form said end region which projects outwardly from said flat sheet material; and bending said flat sheet material blank along fold lines which substantially bisect said diamond-shaped cut-outs and extend perpendicularly with respect to said outer edge to thereby form said corners, said side walls, and said top wall;

wherein the width and thickness of said continuous material zones are selected to permit stretching of said continuous material zones without cracking while said sheet material blank is bent.

2. A method of producing a cover element for a telescopic cover for covering machine tools, the telescopic cover comprising a plurality of said cover elements movable in a longitudinal direction into and out of one another, said cover element having a top wall connecting opposed side walls and an end region extending at a right angle to the longitudinal direction, the end region having a U-shaped cross-section and projecting outwardly from the top wall and the side walls, the method comprising the steps of:

provinding a flat sheet material blank for ultimately producing said top wall, said side walls, and said end region of said cover element;

forming diamond-shaped cut-outs in said flat sheet material blank at corner zones which are disposed to ultimately form corners between said top wall and said side walls in said end region, said diamond-shaped cut-outs formed as respective closed perimeter openings and separated from an outer edge of said sheet material blank by corresponding continuous material zones;

forming a T-shaped cut in said flat sheet material blank prior to forming said end region, said T-shaped cut bordering on said continuous material zones so that the arm of said T-shaped cut extends at a right angle to said outer edge where said end region is formed and the crosspiece of said T-shaped cut extends parallel to said edge;

bending said flat sheet material blank near said outer edge into said U-shaped cross-section to thereby form said end region which projects outwardly from said flat sheet material; and bending said flat sheet material blank along fold lines which substantially bisects said diamond-shaped cut-outs and extend perpendicularly with respect to said outer edge to thereby form said corners, said side walls, and said top wall;

wherein the width and thickness of said continuous material zones are selected to permit stretching of said continuous material zones without cracking while said sheet material blank is bent.

3. A method of producing a sealed corner in a cover element used in a telescopic cover for covering machine tools, the telescopic cover comprising a plurality of said cover elements movable in a longitudinal direction into and out of one another, said cover element having a top wall connecting opposed side walls and an end region extending at a substantially right angle to the longitudinal direction, the end region having a U-shaped cross-section and projecting outwardly from the top wall and the side walls, the method comprising the steps of:

providing a flat sheet material blank;

forming a diamond-shaped cut-out in said flat sheet material blank at a corner zone which is disposed to ultimately form a corner between said top wall and a side wall in said end region, said diamond-shaped cut-out formed as a closed perimeter opening and separated from an outer edge of said sheet material blank by a continuous material zone;

forming a T-shaped cut in said flat sheet material blank prior to forming said end region, said T-shaped cut bordering on said continuous material zone so that the arm of said T-shaped cut extends at a right angle to said outer edge where said end region is formed and the crosspiece of said T-shaped cut extends parallel to said edge;

bending said flat sheet material blank near said outer edge into said U-shaped cross-section to thereby form said end region which projects outwardly from said flat sheet material; and bending said flat sheet material blank along a fold line which substantially bisects said diamond-shaped cut-out and extends perpendicularly with respect to said outer edge to thereby form said corner;

wherein the width and thickness of said continuous material zone are selected to permit stretching of said continuous material zone without cracking while said sheet material blank is bent.

* * * * *